United States Patent

Sunay et al.

[11] Patent Number: 5,940,743
[45] Date of Patent: Aug. 17, 1999

[54] POWER CONTROL OF MOBILE STATION TRANSMISSIONS DURING HANDOFF IN A CELLULAR SYSTEM

[75] Inventors: Oguz Sunay, Irving, Tex.; Ari Hottinen; Marko Teittinen, both of Espoo, Finland

[73] Assignee: Nokia Mobile Phones Limited, Espoo, Finland

[21] Appl. No.: 08/869,784

[22] Filed: Jun. 5, 1997

[51] Int. Cl.⁶ .................................................. H04Q 7/20
[52] U.S. Cl. ......................... 455/69; 455/437; 455/522; 370/331; 370/335
[58] Field of Search .......................... 455/69, 436, 437, 455/438, 439, 522; 370/331, 332, 333, 335, 342

[56] References Cited

U.S. PATENT DOCUMENTS

| | | | |
|---|---|---|---|
| 5,101,501 | 3/1992 | Gilhousen et al. | 455/437 |
| 5,267,262 | 11/1993 | Wheatley, III | 455/69 |
| 5,345,448 | 9/1994 | Keskitalo | 370/95.3 |
| 5,410,733 | 4/1995 | Niva et al. | 455/33.2 |
| 5,483,668 | 1/1996 | Malkamaki et al. | 455/33.2 |
| 5,485,486 | 1/1996 | Gilhousen et al. | 455/522 |
| 5,487,180 | 1/1996 | Ohtake | 455/69 |
| 5,524,009 | 6/1996 | Tuutijarvi et al. | 370/95.3 |
| 5,551,057 | 8/1996 | Mitra | 455/69 |
| 5,574,983 | 11/1996 | Douzono et al. | 455/69 |
| 5,604,766 | 2/1997 | Dohi et al. | 370/335 |
| 5,634,192 | 5/1997 | Meche et al. | 455/437 |
| 5,640,414 | 6/1997 | Blakeney, II et al. | 370/332 |
| 5,722,044 | 2/1998 | Padovani et al. | 455/69 |
| 5,799,005 | 8/1998 | Soliman | 370/335 |

*Primary Examiner*—Curtis A. Kuntz
*Assistant Examiner*—Quochien B. Vuong
*Attorney, Agent, or Firm*—Brian T. Rivers

[57] ABSTRACT

A method and apparatus for controlling the transmission power of a mobile station during handoff of a call between base stations of a cellular system A desired transmission power of a mobile station on an assigned traffic channel of a target base station is determined, and the transmission power of the mobile station is adjusted over a range of power values to be set to the desired transmission power level. The desired transmission power of the mobile station may be determined based on measurements made on the pilot channel of the target base station at the mobile station. Alternately, base station power classes may be defined for the cellular system so that each base station at which it is desired to receive mobile station transmissions at a signal level within a selected range is assigned to a power class associated with that selected range A mobile station involved in a handoff can determine the power level at which it should begin transmitting on a new traffic channel during handoff by determining the power class of the base station to which the new traffic channel is assigned.

18 Claims, 6 Drawing Sheets

POWER CONTROL OF MOBILE STATION TRANSMISSIONS DURING HANDOFF IN A CELLULAR SYSTEM

FIELD OF THE INVENTION

This invention relates to handoff in cellular telecommunications systems and, more particularly to an apparatus and method for controlling the transmission power of a mobile station during handoff of a call between base stations of a cellular system.

BACKGROUND OF THE INVENTION

In the field of cellular telecommunications, efforts have recently been directed towards developing Code Division Multiple Access (CDMA) type systems In a CDMA type system multiple users, each using a channel identified by a uniquely assigned digital code, simultaneously communicate with the system while sharing the same wideband frequency spectrum.

CDMA provides several advantages over conventional frequency division multiple access (FDMA) or time division multiple access (TDMA) systems. In FDMA systems users are assigned a unique frequency for each of mobile to base (uplink or reverse link) and base to mobile (downlink or forward link) communications In TDMA systems, users are each assigned a unique frequency, for the uplink and downlink, and a unique time period in which to transmit or receive on that frequency These FDMA and TDMA systems require planning for allocation of channel frequencies and/or time periods on these frequencies to mobile stations and base stations. In a CDMA system, however, frequency and time period assignment planning for mobile stations and the base stations of cells is not necessary, as in FDMA and TDMA systems, because all CDMA base stations share the entire downlink frequency spectrum, and all mobiles share the entire uplink frequency spectrum The fact that the wideband frequency spectrum is shared by all uplink or downlink users in CDMA also increases capacity, since the number of users that can be multiplexed simultaneously is only limited by the number of digital codes available to identify the unique communications channels of the system, and by the total interference caused by the other users sharing the same spectrum, and not by the number of radio frequency channels available. Additionally, since the energy of the transmitted signals are spread over the wide band uplink or downlink frequency band, selective frequency fading does not affect the entire CDMA signal. Path diversity is also provided in a CDMA system. If multiple propagation paths exist, they can be separated as long as the differences in paths delays exceeds 1/BW, where BW equals the bandwidth of the transmission link.

In a CDMA cellular system the transmission power levels of mobile stations become important. In CDMA, the signals from many different mobile stations are received at the same frequency simultaneously at a base station. Because of the nature of CDMA demodulation, it is necessary that the signal received at the base station from each mobile station be as close as possible to a single level so that the signal from one mobile station does not overwhelm the signal from another mobile station (near-far problem). In a CDMA cellular system a power control process may be used to control each mobile station's transmission power level so that the signal level received at the base station from each mobile station is as close as possible to a single predetermined level. Additionally, the power control process may also be used to assure that the received signal levels at the base station are of an adequate level, so that calls are not dropped One example of a CDMA mobile station power control scheme is the power control used by systems specified in the Telecommunications Industry Association/ Electronic Industries Association (TIA/EIA) IS-95 standard Another related CDMA mobile station power control scheme is the power control used by systems specified in the ANSI-008 standard, which is the personal communications systems (PCS) 1900 Mhz version of IS-95.

In the IS-95 power control process, a mobile station first adjusts its transmission power level using an access channel assigned to a base station through which the mobile station is attempting to gain access to the system. To gain access the mobile station follows an open loop power control process that involves transmitting access probe transmissions at a relatively low power level on the access channel and gradually increasing the level of subsequent access probe transmissions in access probe correction increments set by the system, until a response is obtained from the system and the mobile station gains access to the system The transmission power of each access probe transmission on the access channel is given by the equation:

$$\text{mean output power (dBm)} = \\ -\text{mean input power (dBm)} - 73 + \text{NOM\_PWR (dBm)} + \\ \text{INIT\_PWR (dBm)} + \text{the sum of all access probe corrections} \quad (1)$$

The values NOM_PWR and INIT_PWR are system parameters having values assigned by the system. The mean input power is the power level of the reverse link access channel signal as received at the mobile station.

The ANSI-008 standard equation is similar, but because of the frequency difference, has a constant equal to 76 instead of 73, and also includes an additional value that is added to increase the range of NOM_PWR, the additional value being defined as 16*NOM_PWR_EXT, which is a system parameter. IS-95 could also be modified to include a similar value.

Once the mobile station gains access to the system, it waits in an idle mode until a call is initiated from either the mobile station to the base station, or from the base station to the mobile station. A reverse traffic channel and a forward traffic channel are then assigned for the call. When transmitting on the IS-95 reverse traffic channel, the mobile station initializes at the level set on the access channel by the open loop process defined by equation (1). Once the reverse traffic channel transmission power level is initialized and the call begins, the system and mobile station then also begin a closed loop power control process The closed loop power control process allows the signal level received at the base station from each mobile station transmitting on a reverse traffic channel to be set as close as possible to a single predetermined level. In the closed loop power control process the base station transmits closed loop power control corrections in the form of power control bits to the mobile station in a power control subchannel that is included in the forward traffic channel. A single power control bit is transmitted in the power control subchannel every 125 ms. A "one" bit transmitted in the power control subchannel indicates that the mobile station should increase its transmission power 1 db, while a "zero" bit indicates that the mobile station should decrease its transmission power 1 db. Each time a valid control bit is received at the mobile station in the power control subchannel, the mobile station adjusts its output power level up or down in an increment of 1 db. The mobile station is capable of adjusting the transmission power within a range of ±24 db around the level set by the open loop power control process on the access channel and, as the call is ongoing, the transmission power of the mobile station on the reverse traffic channel is adjusted so that a desired power level is reached and maintained The mobile station also simultaneously continues the open loop power control process, this time using the forward traffic channel. In the open loop process the mean input power received on the reverse traffic channel is the determining value. When involved in the call, the inputs that effect changes in the mobile station's transmission power are the mean input power as received from the base station on the forward traffic channel and, the closed loop power corrections indicated by the power control bits received on the forward power control channel. During a call, the mobile station output power level on the reverse traffic channel is given by the equation:

$$\text{mean output power (dBm)} = \tag{2}$$
$$-\text{mean input power (dBm)} - 73 + \text{NOM\_PWR (dBm)} +$$
$$\text{INIT\_PWR (dBm)} + \text{the sum of all access probe corrections} +$$
$$\text{the sum of all closed loop power control corrections}$$

As for equation 1, the ANSI-008 standard equation is similar, but because of the frequency difference, has a constant equal to 76 instead of 73, and also includes an additional value that is added to increase the range of NOM_PWR, the additional value defined as 16*NOM_PWR_EXT, which is a system parameter.

A handoff of the call from one base station to another base station may occur as the mobile station moves throughout the system In a CDMA system two types of handoff are possible A soft handoff occurs when the mobile station commences communications with the new base station without interrupting communications with the old base station. Soft handoff can only be used between CDMA traffic channels having identical channel frequency assignments. A CDMA to CDMA hard handoff occurs when the mobile station is transitioned between two disjoint sets of base stations, different frequency assignments, or different traffic channel frame offsets.

During soft handoff of a call, the system continues to use the open loop power control process to adjust the transmission power of the mobile station on the reverse traffic channel as the mobile switches to the traffic channels of the new base station. During CDMA to CDMA hard handoff a value of a nominal power (NOM_PWR) setting for the target cell is transmitted to the mobile station in a handoff message. The nominal power(NOM_PWR) setting is then used to set an initial power transmission level on the traffic channel of the new base station. When the mobile station begins transmitting on the new reverse traffic channel, open and closed loop power control then take over so that the transmissions continue at the correct level.

In a CDMA system having cells of different sizes and base stations with different size transmitters, the base station in a particular cell may have a different desired received signal strength for signals received from mobile stations, as compared to another cell's base station's desired received signal strength for signals received from mobile stations If this difference exists between neighboring cells, a problem could occur during handoff of a call between the neighboring cells. If the handoff is from a higher power cell to a lower power cell, there could be a potential near-far problem among the mobile stations in the new cell. The mobile station involved in the call handoff may initially be at a power level much greater than other mobile stations in the new cell. The signal from the mobile station involved in the call handoff may then overwhelm the signals from the other mobile stations at the base station causing a near far problem If the handoff is from a lower power cell to a higher power cell, there could be a potential dropped call problem. The mobile station involved in the call handoff may initially be at a power level much lower than other mobile stations in the new cell. The signal strength received at the new base station from the mobile station in call handoff may not be adequate to maintain the connection on the reverse link, and a dropped call could occur in this situation.

For the IS-95 type hard handoff, the power control process used may not be adequate to avoid problems in call handoff between cells of different sizes Again, because handoff occurs at the threshold where the received signal level on the measurement channel of the current base station is slightly greater than the received signal level on the measurement channel of the new base station, the variable of the mean input power used in equations (1) will not cause a significant change in mobile station transmission power. In IS-95 the transmission power level of the mobile station is adjusted at hard handoff by the new base station transmitting a new NOM_PWR value to the mobile station. The NOM_PWR value is typically an estimated value, set to adjust the mobile station transmission power level to an appropriate initial level in the target cell. The new NOM_PWR value is then used in the mobile station to calculate a new mean output power, as given by equation (1) above for the initial transmission of the mobile station on the reverse traffic channel after handoff. In this process the range of the value of NOM_PWR is from −8 dB to 7 dB. In the ANSI-008 standard the value 16* NOM_PWR_EXT is used along with NOM_PWR in equation 1, so that the range is from −24 dB to 7 dB. In either system, if the mobile station transmission power level is needed to be adjusted beyond what the range allows, a dropped call or near far problem could occur.

SUMMARY OF THE INVENTION

The present invention provides a method and apparatus for controlling the transmission power of a mobile station during handoff of a call between base stations of a cellular system The method and apparatus allows the desired transmission power of the mobile station on the assigned traffic channel of a target base station to be accurately estimated and allows the transmission power of the mobile station to be adjusted over a widely varying range of power values, and to be set to this desired transmission power for initial transmissions on the assigned traffic channel. Use of the method and apparatus can reduce the potential for dropped calls or the occurrences of near-far problems during handoff between base stations of different size cells, where the different size cells require mobile stations to transmit at different power levels, depending on cell size.

In an embodiment of the invention, the initial transmission power of the mobile station on the assigned traffic channel of the target base station is calculated based on measurements made on a handoff measurement channel of the target base station at the mobile station. In a presently preferred embodiment of this invention the handoff measurement channnl is a pilot channel, although the teaching of this invention is not limited for use only with the pilot channel The method and apparatus may be implemented into a code division multiple access (CDMA) cellular system having cells of different sizes, i.e., cells with different size coverage areas and, therefore, differing requirements for the signal levels at which mobile station transmissions should be received at the base stations of the cells.

As a mobile station involved in a call moves throughout the cells of the system and predetermined conditions for handoff are satisfied, a handoff from a first base station to a second base station may be initiated by the mobile station. To initiate a handoff the mobile station transmits a measurement message to a first base station that is currently controlling the call. The measurement message includes a value that indicates the signal strength PT(r) of the pilot channel of the second base station. Upon receiving the measurement message, the first base station sends a handoff notification message to the second base station. If the second base station has the resources to accept the handoff, a handoff acceptance message is sent back to the first base station. After receiving a handoff acceptance message the first base station then forwards the PT(r) value to the second base station. The second base station then calculates an estimate of the path loss between the mobile station and the second base station using the PT(r) value and the transmission power PT(t) of the second base station on the pilot channel. The second base station then calculates a transmission power level for the mobile station based on the path loss and a desired value of the received power level at the second base station as received from the mobile station. From the mobile station transmission power level the second base station then configures mobile station power data that can be used by the mobile station to adjust its output power so that the desired signal level will be received at the second base station. The second base station then sends the mobile station power data to the first base station. The first base station then sends a handoff direction message to the mobile station, with the handoff direction message including the mobile station power data. Upon receiving the handoff direction message the mobile station then uses the mobile station power data to adjust its output power and begins transmitting on a reverse traffic channel to the second base station.

In an alternative of this embodiment, when the second base station has accepted the handoff, the second base station may send a value indicating the transmission power PT(t) of the second base station on the pilot channel to the mobile station and, the initial transmission power for the mobile station may be calculated in the mobile station, instead of at the second base station.

In another embodiment of the inventions base station power classes are defined for a cellular system and power class information is used to set an initial transmission power level for the mobile station on the traffic channel of the target base station. In the cellular system, the base stations of different size cells having different power requirements for mobile station transmission reception are each assigned to one of a plurality of power classes of the system. The power classes may be defined so that each base station at which it is desired to receive mobile station transmissions at a signal level within a selected range is assigned to a certain power class associated with that selected range. A mobile station involved in a handoff can determine the power level at which it should begin transmitting on a new traffic channel during handoff by determining the power class of the base station to which the new traffic channel is assigned.

In one alternative of the embodiment, the phases of the pilot channel PN sequences (PN offset) that are used to identify the base stations of a CDMA system transmitting the pilots, may be assigned according to the power classes of the base stations. Each system PN offset may then be associated with a base station power class in a memory of the mobile station. As a mobile station involved in a call moves throughout the cells of the system, a handoff from a first base station to a second base station may be initiated by the mobile station transmitting a measurement message to a first base station that is currently controlling the call. Upon receiving the measurement message the first base station sends a handoff notification to the second base station. If the second base station has the resources to accept the handoff, a handoff acceptance message is sent back to the first base station. After receiving a handoff acceptance message the first base station then sends a handoff command message to the mobile station. Upon receiving the handoff command message the mobile station determines the target base station power class from the PN offset of the assigned traffic channel, adjusts its output power accordingly for the base station power class and, begins transmitting on the reverse traffic channel to the second base station.

In another alternative, system base station identification fields(base station ID) may be assigned throughout the system, so a base station's power class may be known by knowing the base station ID. Mobile stations may then be programmed to recognize the power class of a base station from a received base station ID and to then adjust initial traffic channel transmission power after handoff according to the power class of the base station.

BRIEF DESCRIPTION OF THE DRAWINGS

A more complete understanding of the method and apparatus of the present invention may be had by reference to the following detailed description when read in conjunction with the accompanying drawings wherein.

DETAILED DESCRIPTION OF THE INVENTION

Figure 1:
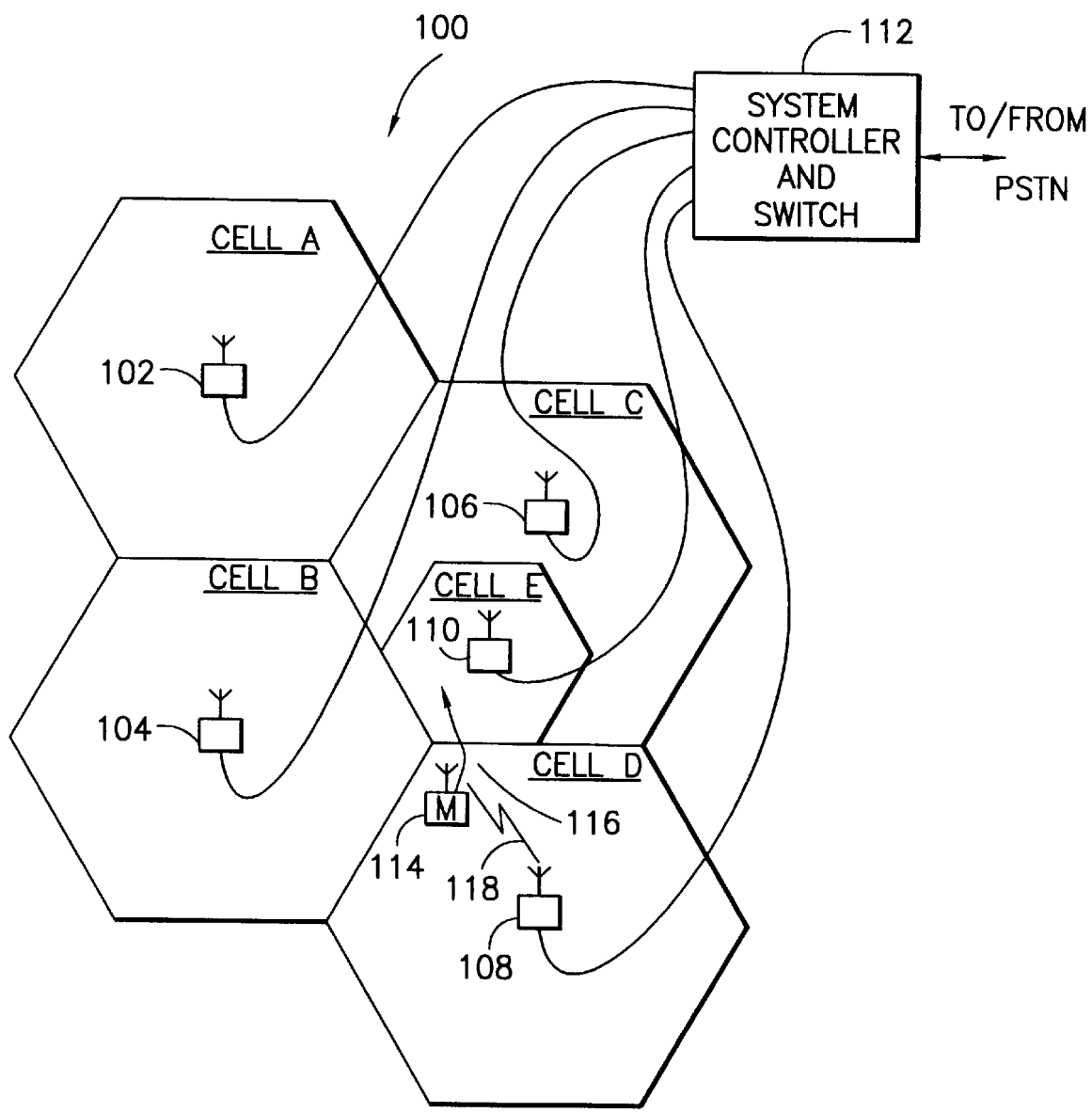
FIG. 1 illustrates a block diagram of a telecommunications system constructed according to an embodiment of the invention.

FIG. 1 illustrates a block diagram of a telecommunications system 100 constructed according to an embodiment of the present invention System 100 comprises mobile station 114 and, an infrastructure comprising system controller and switch 112 and base stations 102, 104, 106, 108 and 110. A subscriber who subscribes to service provided by the operator of cellular system 100 may use the mobile station 114 to make and receive phone calls over a radio interface, such as is shown by radio interface 118 between mobile station 114 and base station 108, as the subscriber moves throughout the coverage area of cellular system 100. Each of base stations 102, 104, 106, 108 and 110 provide coverage over a separate area of system 100, shown as cell A, cell B, cell C, cell D and cell E, respectively in FIG. 1 Base stations 102, 104, 106, 108 and 110 are connected to system controller and switch 112 as in a conventional cellular system. System controller and switch 112 is connected to a public switched telephone network to allow subscribers of cellular system 100 to make and receive phone calls from the landline public network Cell A, cell B, cell C and cell D are shown to be of about the same size, and may be the size of what is commonly called a "micro cell" or a cell of about 500 meters in width. A micro cell of system 100 may require a maximum mobile station transmission power level of 200 mw. Cell E of system 100 is shown to be contained within the coverage area of cell C, and may be the size of what is commonly called a "pico cell" or, a cell of about 100 meters in width. A pico cell of system 100 may require a maximum mobile station transmission power level of 20 mw. In the embodiment of FIG. 1, cellular system 100 may operate according to the Telecommunications Industry Association/ Electronic Industry Association (TIA/EIA) IS-95 standard for code division multiple access (CDMA) cellular systems, with the transmission power levels within cell E scaled down for pico cell operation.

Figure 2:
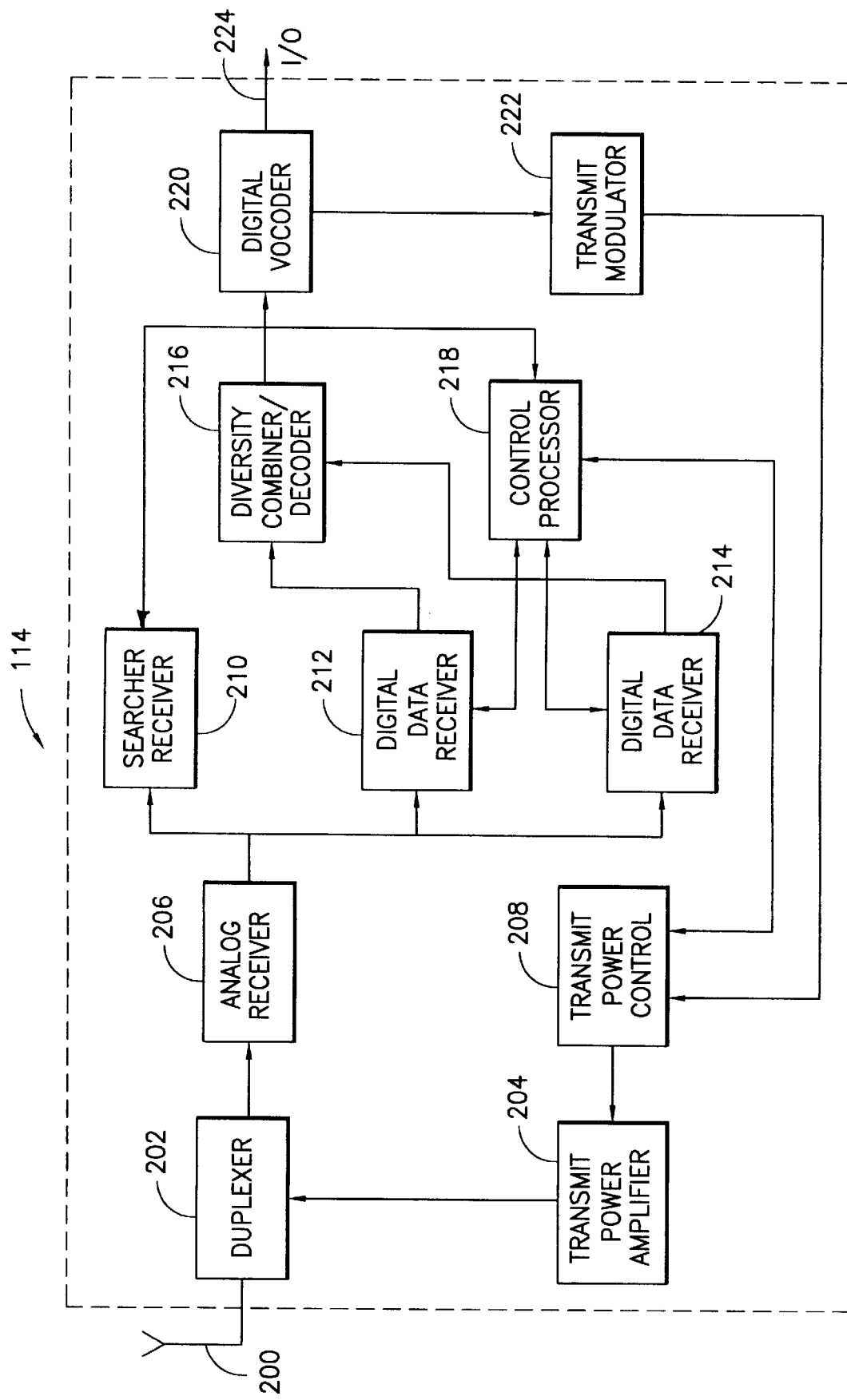
FIGS. 2 is a block diagram of portions of a CDMA mobile station that is constructed and operated according to an embodiment of the present invention.

Referring now to FIG. 2, therein is a block diagram of portions of mobile station 114 of the embodiment of the invention shown in FIG. 1 Mobile station 114 comprises antenna 200, duplexer 202, transmit power amplifier 204, analog receiver 206, transmit power controller 208, searcher receiver 210, digital data receiver 212, digital data receiver 214, diversity combiner/decoder 216, control processor 218, user digital vocoder 220, transmit modulator 222 and user interface 224. Mobile station 114 may function as a conventional CDMA mobile station in functions other than the handoff power control function. Mobile station 114 includes modifications that implement the handoff power control of the present invention.

Antenna 200 is coupled to analog receiver 206 through duplexer 202. Signals received at antenna 200 are input to analog receiver 206 through duplexer 202. The received signals are converted to an IF frequency and then filtered and digitized in analog receiver 206, for input to digital data receiver 212, digital data receiver 214 and searcher receiver 210. The digitized IF signal input to digital data receiver 212, digital data receiver 214 and searcher receiver 210 may include signals from many ongoing calls together with the pilot carriers transmitted by the base station of the cell site in which the mobile station is currently located, plus the pilot carriers transmitted by the base stations in all neighboring cell sites. Digital data receiver 212 and digital data receiver 214 perform correlation on the IF signal with a PN sequence of a desired received signal. The output of digital data receivers 212 and 214 is a sequence of encoded data signals from two independent paths. Searcher receiver 210 scans the time domain around the nominal time of a received pilot signal of a base station for other multi-path pilot signals from the same base station and for other signals transmitted from different base stations. Searcher receiver 210 measures the strength of any desired waveform at times other than the nominal time. Searcher receiver 210 generates signals to control processor 218 indicating the strengths of the measured signals.

The encoded data signals output from digital data receiver 212 and digital data receiver 214 are input to diversity combiner/decoder 216. In diversity combiner/decoder 216 the encoded data signals are aligned and combined, and the resultant data signal is then decoded using error correction and input to digital vocoder 220. Digital vocoder 220 then outputs information signals to the user interface 224. User interface may be a handset with a keypad, or another type of user interface such as a laptop computer monitor and keyboard.

For transmission of signals from mobile station 114, a signal received at user interface 224 is input to user digital vocoder 220 in digital form, as for example data or voice that has been converted to digital form at user interface 224. In digital vocoder 220 the signal is encoded and output to transmit modulator 222. Transmit modulator 222 Walsh encodes the signal and, then modulates the Walsh encoded signal onto a PN carrier signal, with the PN carrier sequence being the PN carrier sequence of the CDMA channel to which the mobile station is assigned. The PN carrier information is transmitted to mobile station 114 from the system 100 and is transferred to control processor 218 from digital data receivers 212 and 214 after being received from the system Control processor 218 sends the PN carrier information to transmit modulator 222. The PN modulated signal is then output from transmit modulator 222 to transmit power control 208. Transmit power control 208 sets the level of the transmission power of mobile station 114 according to commands received from control processor 218. The power control commands may be generated by control processor 218 according to commands received from the system or may be generated by software of control processor 218, according to predetermined criteria, in response to data received from the system through digital data receivers 212 and 214.

The modulated signal is then output from transmit power control 208 to transmit power amplifier 204 where the signal is amplified and converted to an RF transmission frequency signal. The RF frequency signal is then output from power amplifier 204 to duplexer 202 and is transmitted from antenna 200.

Figure 3:
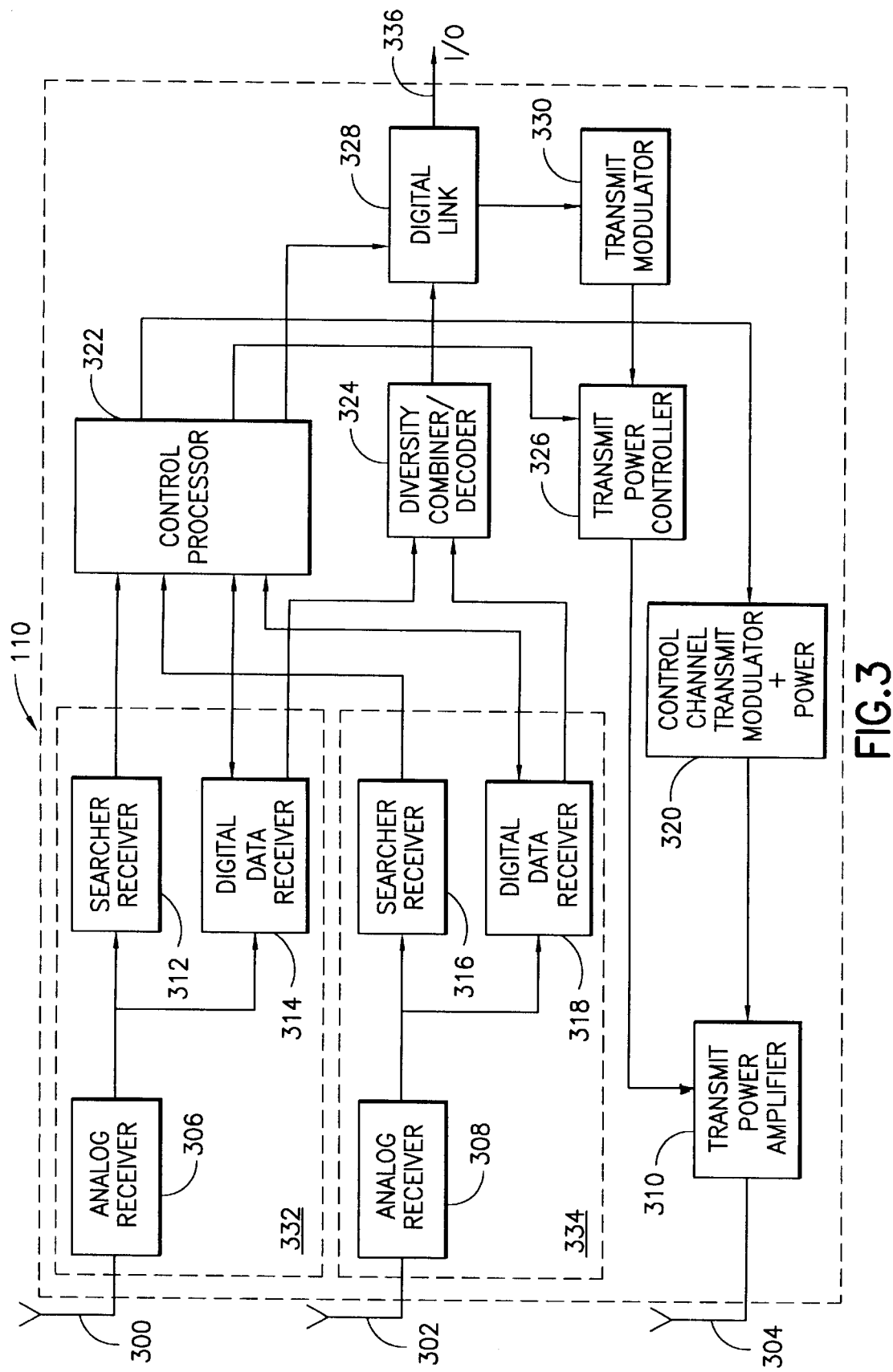
FIG. 3 is a block diagram of portions of a CDMA base station that is constructed and operated according to an embodiment of the present invention.

Referring now to FIG. 3, therein is a block diagram of portions of a base station 110 of the embodiment of the invention shown in FIG. 1 The block diagrams of any of the other base stations 102, 104, 106, and 108, of FIG. 1 may be equivalent to that shown in FIG. 3 for base station 110. Base station 110 includes a first receiver section 332, a second receiver section 334, control processor 322, diversity combiner/decoder 324, transmit power controller 326, digital link 328, transmit modulator 330, control channel transmitter/modulator 320, transmit power amplifier 310, and antenna 304. First receiver section 332 comprises antenna 300, analog receiver 306, searcher receiver 312 and digital data receiver 314. Second receiver section 334 comprises antenna 302, analog receiver 308, searcher receiver 316 and digital data receiver 318.

First receiver section 332 and second receiver section 334 provide space diversity for a single signal that may be received at both of antennas 300 and 302. The signals received at antenna 300 are input to analog receiver 306 where the signal is filtered, converted to an IF frequency and, digitized to generate a digital signal. The digital signal is then output from analog receiver 306 to searcher receiver 312 and digital data receiver 314. Searcher receiver 312 scans the time domain around the received signal to verify that digital data receiver 314 tracks the correct signal. Control processor 322 generates the control signals for digital data receiver 314 according to a signal received from the searcher receiver 312, so that the correct signal is received at digital data receiver 314. Digital data receiver 314 generates the proper PN sequence necessary to decode the digital signal received from analog receiver 306 and generates weighted output symbols for input to diversity combiner/decoder 324. Antenna 302, analog receiver 308, searcher receiver 316 and digital data receiver 318 of section receiver section 334 function identically to the components of first receiver section 332 to generate a second set of weighted output symbols. The weighted symbols from digital data receiver 312 and digital data receiver 318 are then combined and decoded in diversity combiner/decoder 324 to generate received digital data which is then output through digital link 328 to system controller and switch 112 of FIG. 1.

When data received from system controller and switch 112 is to be transmitted from base station 110 on a traffic channel, the data is received at digital link 328 over I/O 336 and sent to transmit modulator 330. Transmit modulator 330 then modulates the data using the appropriate Walsh function assigned to the mobile station to which the base station is transmitting. The Walsh modulated data is then spread by a voice channel PN sequence having the appropriate time shift and input to transmit power controller 326. Transmit power control 326 controls the transmission power in response to control signals received form control processor 322. The power control commands may be generated by software in control processor 322. The signal output from power controller 326 is input to transmit power amplifier 310, and is then transmitted from antenna 304. Base station 100 may have multiple transmit modulator and transmit power controllers for transmitting to multiple mobile stations.

In system 100 a pilot channel that may be used for handoff measurements is generated by each base station. The pilot channel generated for each base station of system 100 is unique, with each pilot channel being identified by the time shift (or phase) of the PN sequence transmitted from the particular base station, rather than by a unique PN sequence. The pilot channel for base station 110 may be generated in control channel modulator/power control 320 in response to control signals generated by control processor 322. The pilot channel signal may be generated by using a Walsh code sequence of all zeros and, multiplying the Walsh code sequence by the system PN sequence to generate a pilot channel signal having the appropriate phase for the base station 110.

Figure 4:
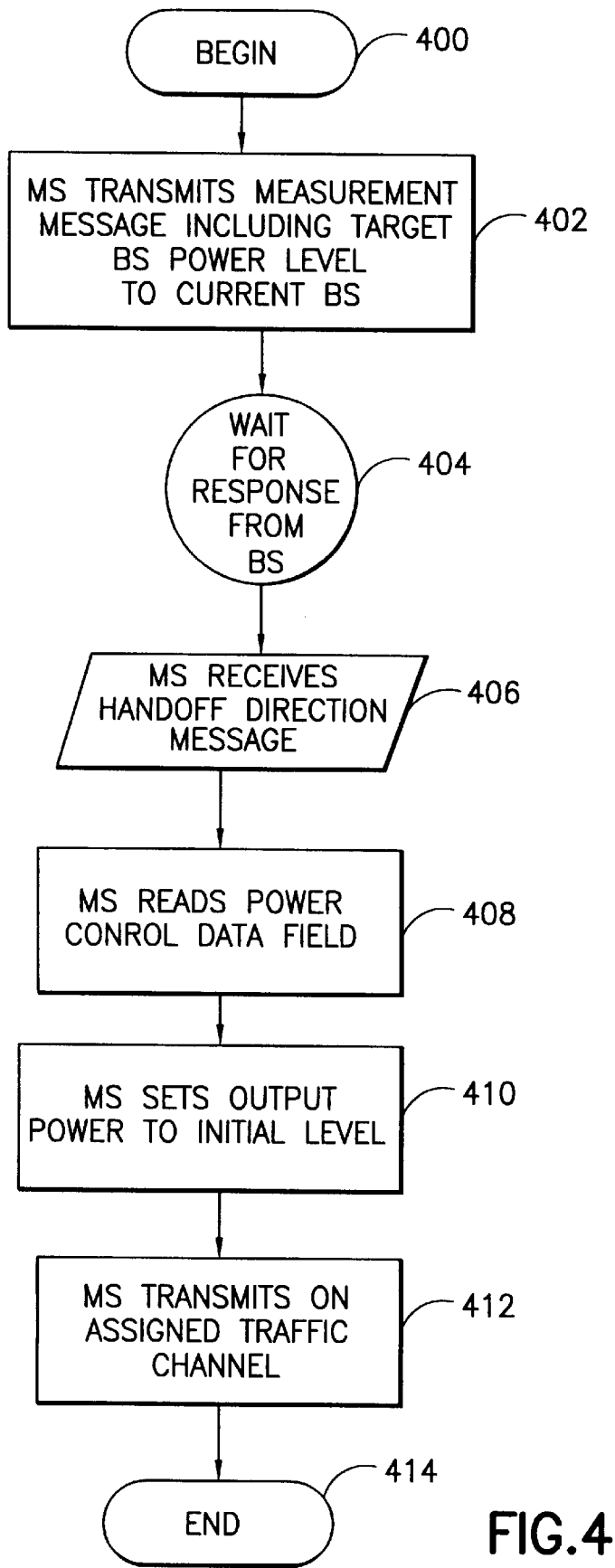
FIG. 4 is a flow diagram illustrating handoff power control process steps performed by the mobile station of FIG. 2 according to an embodiment of the present invention.
Figure 5:
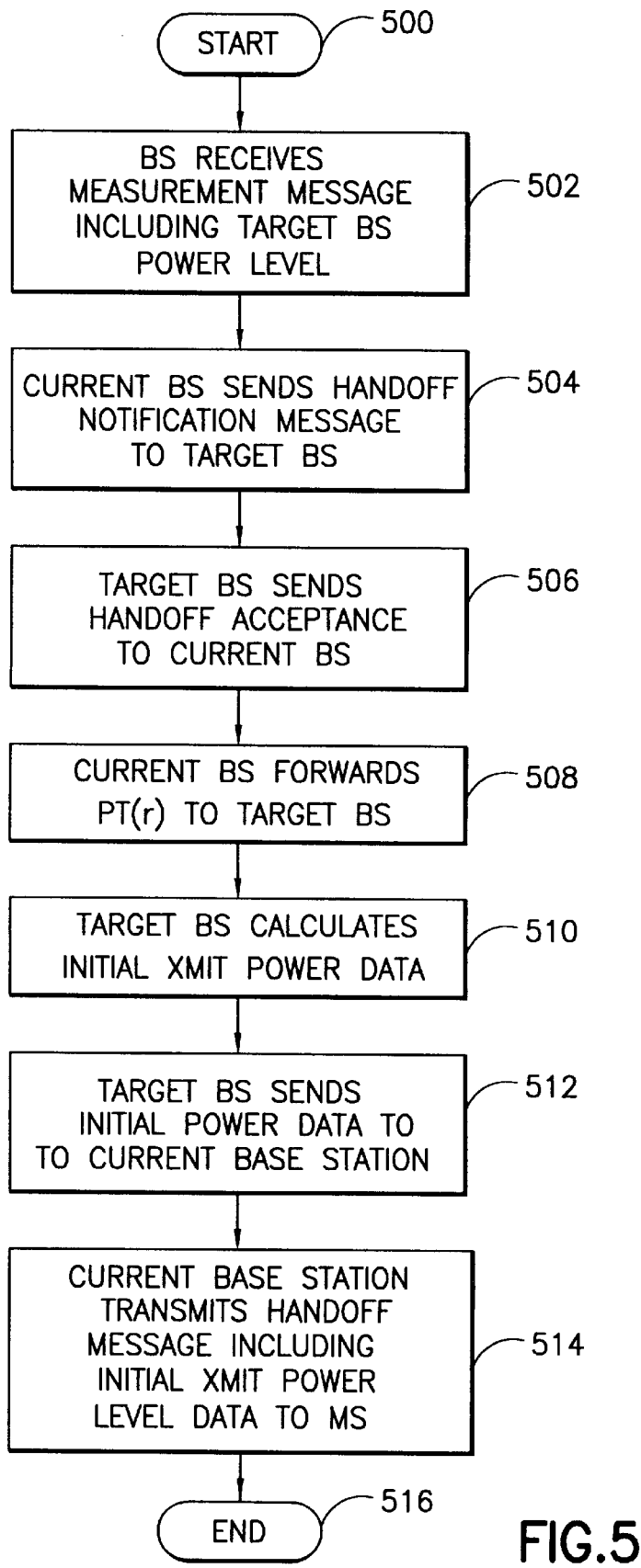
FIG. 5 is a flow diagram illustrating handoff power control process steps performed by the base station of FIG. 3 according to an embodiment of to the present invention.

Referring now to FIGS. 4 and 5, therein are flow diagrams illustrating process steps performed by a mobile station and target base station, respectively, according to an embodiment of the present invention. In this embodiment, the output power of a mobile station is adjusted at handoff according to the estimated power loss between the mobile station and the target base station of the handoff. The estimated power loss is based on handoff channel measurements made at the mobile station. The mobile station's output power is adjusted, according to the estimated power loss, to within an initial acceptable range. This minimizes dropped calls or near far problems that could occur when handoff is between cells of different sizes. FIGS. 4 and 5 can be explained with reference to FIGS. 1–3 and an exemplary handoff of mobile station 114 from cell D to cell E.

As mobile station 114 moves within cell D in the direction of arrow 116 towards cell E, searcher receiver 210 of mobile station 114 measures the received signal strengths on the system pilot channels in the handoff candidate set and provides signal strength measurement results to control processor 218. The handoff candidate set contains the pilots of system 100 that are received at a sufficient strength to indicate that they are handoff candidates and in this example includes the pilot channel of cell E or base station 110. When mobile station 114 is at a certain location on, or near, the borders of cells D and E, the candidate pilot channel from base station 110 will be received at a signal strength level that is a predetermined margin greater than the signal strength level received on the pilot channel of base station 108. At this point, control processor 218 generates a measurement message indicating the measurement results and the PN offset of the measured candidate pilot of base station 110.

The process begins at step 402 of FIG. 4 as the measurement message generated in control processor 218 is transmitted from mobile station 114 to the current base station 108 Next, the process moves to the wait state of step 404 and mobile station 114 waits for a response from base station 108. While mobile station 114 is in the wait state of step 404 of FIG. 4, the process moves to step 502 of FIG. 5 as base station 108 receives the measurement message transmitted from mobile station 114. Next, at step 504 base station 108 sends a handoff notification message to base station 110 through system controller and switch 112. Control processor 322 receives the handoff notification message through digital link 328 and determines that a free traffic channel exists for mobile station 114. At step 506, control processor 322 then generates an acceptance message that is returned to base station 108 through digital link 328 and system controller and switch 112. Next, at step 508, base station 108 sends a PT(r) value, where PT(r) is the received power level of the pilot of base station 110, to base station 110 through system controller and switch 112 and the PT(r) value is sent to control processor 322 through digital link 328. Next, at step 510, control processor 322 calculates an initial transmission power data for mobile station 114. At step 510, control processor 322 may first calculate the pathloss (PATHLOSS), between mobile station 114 and base station 108, by subtracting PT(r) from the transmission power level PT(t) of the base station 110. Control processor 322 may then calculate an estimated transmission power level PM(t) for mobile station 114 by adding the pathloss to the level at which base station 108 desires to receive the signal from mobile station 114. When PM(t) is known, it may be used to calculate power control data to be sent to mobile station 114. PM(t) may be used, for example, to further calculate a power adjustment value (PAV) to be added to an IS-95 extended handoff direction message having additional fields along with the NOM_PWR value. The power adjustment value may be used to modify the open and closed loop power control equations used by mobile station 114. In this way the range of adjustments allowed by changing the $NOM_{13}$ PWR value is extended to a range that may be necessary for inter-tier handoffs. The NOM_PWR value and the PAV value may then be each set to sum to the necessary adjustment. The use of power control data in the extended handoff direction message has an advantage in that the existing IS-95 air interface could be used, and minimum modifications would be required to be made to mobile station software. Next, at step 512, the PAV value is then sent from base station 108 to base station 110. The control processor of base station 110 then formats an extended handoff direction message containing additional fields including the PAV value and transmits the extended handoff direction message to mobile station 114. The PAV value may be included in place of the reserved field of the extended handoff direction message.

The process moves to step 406 of FIG. 4, where mobile station 114 receives the extended handoff direction message from base station 110. The process then moves to step 408. At step 408 control processor 218 of mobile station 114 reads the PAV data contained in the extended handoff direction message. Next, at step 410, control processor 218 generates a message to transmit power controller 208 directing transmit power control 208 to adjust the initial transmission power of the mobile station on the assigned traffic channel at handoff to the level calculated from the NOM_PWR and PAV values by control processor 218. Control processor 218 may calculate the desired initial transmission power for the mobile station by replacing the NOM_PWR and INIT_PWR fields in the mobile station output power control equation to begin transmissions on the new traffic channel so that:

$$\text{mean output power (dBm)} = \quad (3)$$
$$-\text{mean input power (dBm)} - 73 + \text{NOM\_PWR} + \text{PAV}$$

After the initial transmission power for mobile station 114 is set by transmit power control 208 the process moves to step 412. At step 412, transmit power amplifier 204 is powered on and mobile station 114 begins transmitting on the assigned reverse traffic channel of base station 108 at the initial transmission power level. As an alternative, the calculation of the initial mobile station transmission power on the assigned traffic channel of the target base station may also be performed in the mobile station 114. In this alternative, the transmission power level PT(t) of base station 108 on the pilot channel and the power level PM(r) at which it was desired to receive the signal from mobile station 114 are transmitted from the target base station 110 to mobile station 114 through the current base station 108 in place of the mobile station power control data (PAV). Alternatively, the PT(t) and PM(r) values could be transmitted from target base station 110 directly to mobile station 114 on the pilot channel of target base station 110.

In this case control processor 218 of mobile station 114 calculates the pathloss (PATHLOSS) between mobile station 114 and base station 108 by subtracting PT(r) from PT(t). Control processor 218 may then calculate an estimated initial transmission power level PM(t) by adding PATHLOSS to the level at which base station 108 desires to receive the signal from mobile station 114 (PM(r)). The initial transmission power for mobile station 114 may be set in transmit power control 208 by appropriate commands sent from control processor 218. In this alternative it would also be possible to use PM(t) to calculate a NOM_PWR value to be used in the open and closed loop power control processes after handoff. NOM_PWR would then not have to be estimated by the target base station. This NOM_PWR value could be calculated by the equation:

$$\text{PM(t) (dBm)} = -\text{mean input power (dBm)} - 73 + \text{NOM\_PWR} \quad (4)$$

where the mean input power is as initially received from the target base station on the traffic channel after handoff.

In an alternative embodiment of the invention, base station power classes are defined for a cellular system. In a cellular system according to this embodiment, the base stations of different size cells having differing mobile station transmission power requirements are each assigned to one of a plurality of power classes of the system. The power classes may be defined so that each includes cells having mobile station transmission power requirements within a certain range. This may be done according to cell size. For example, in system 100 of FIG. 1 all of the micro sized cells, Cell A, Cell B, Cell C and Cell D, may be assigned to a first power class and, all pico sized cells, including Cell E, may be assigned to a second power class. When a mobile station is involved in a handoff it can then adjust its initial output power on the newly assigned traffic channel according to the power class of the target base station of the handoff.

Figure 6:
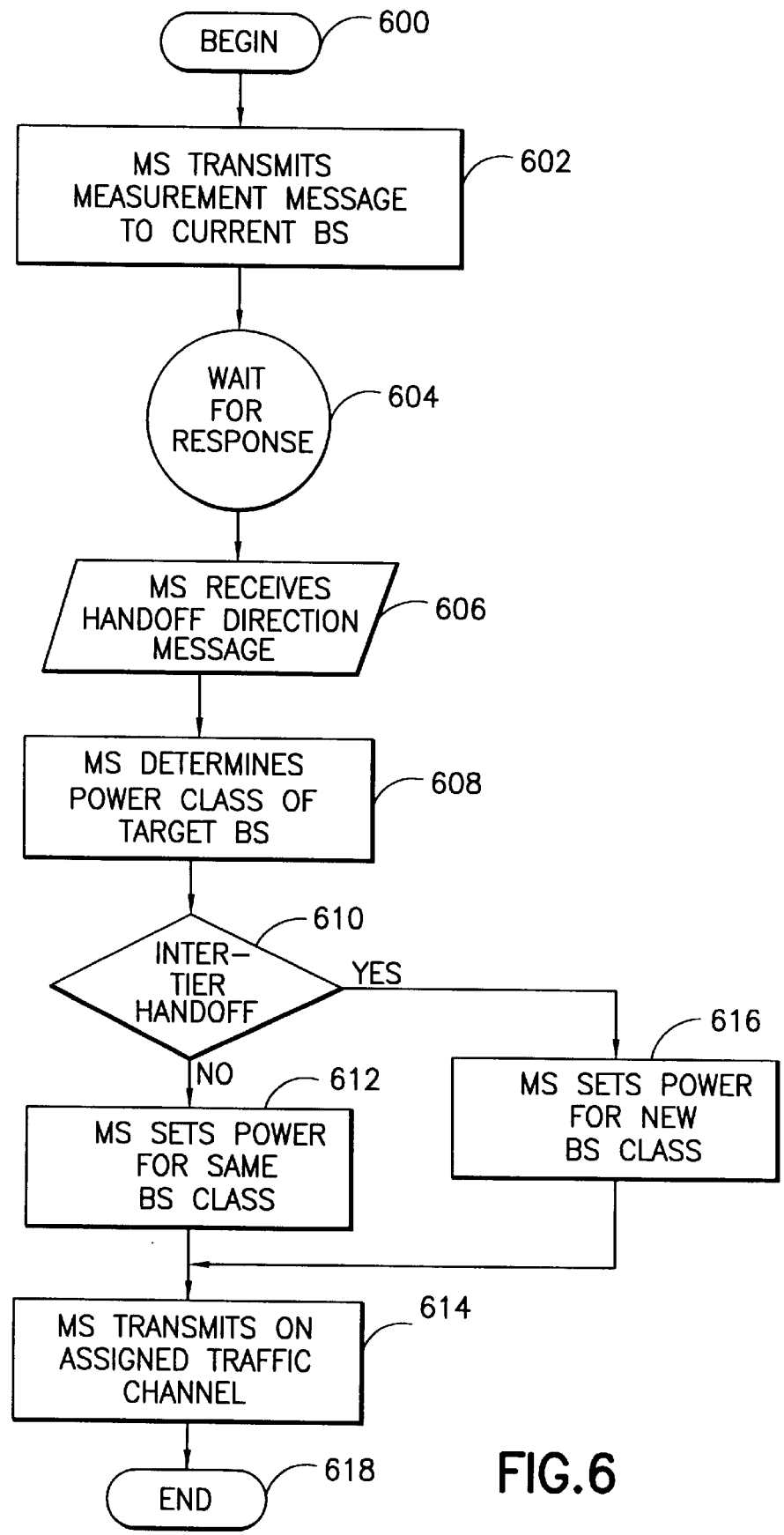
FIG. 6 is a flow diagram illustrating handoff power control process steps performed by the mobile station of FIG. 2 according to an alternative embodiment of the present invention.

Referring now to FIG. 6, therein is shown a flow diagram illustrating process steps performed by a mobile station 114 according to the alternative embodiment of the present invention. FIG. 6 can be explained with reference to FIGS. 1–3 and an exemplary handoff of mobile station 114 from cell D to cell E. In this example, cell D is assigned to a first power class and cell E is assigned to a second power class.

As mobile station 114 moves within cell D in the direction of arrow 116 towards cell E, searcher receiver 210 of mobile station 114 measures the received signal strengths on the system pilot channels of the handoff candidate set and provides signal strength measurement results to control processor 218. The signal strength measurements identify each of the pilot channels by the PN offset of the pilot channel. The handoff candidates set contains the pilots of system 100 received at a sufficient strength to indicate that they are handoff candidates, and includes the pilot of cell E or base station 110. When mobile station 114 is at a certain location on or near the borders of cells D and E, the signal of the pilot from base station 110 will be received at a signal strength level that is a predetermined margin greater than the signal strength level received on the pilot of base station 108. At this point, control processor 218 generates a measurement message indicating the measurement results and the PN offset (identity) of the measured candidate pilot channel.

The process begins at step 602 of FIG. 6 as the measurement message generated in control processor 218 is transmitted from mobile station 114 to the current base station 108. Next, the process moves to the wait state of step 604 where mobile station 114 waits for a response from base station 108. While mobile station 114 is in the wait state of 604, process steps necessary for handoff are performed within the infrastructure of system 100. As an example, this may be any procedure that is compatible with the IS-95 system standard in which a traffic channel of base station 110 is assigned for the handoff of mobile station 114 and a handoff direction message, including channel assignment data, is sent from base station 108 to mobile station 114. When the handoff procedure performed within the system is completed, the handoff direction message is received by mobile station 114.

At step 606 the handoff direction message is received by mobile station 114. Next, at step 608, the message is transferred through receiver sections 332 and 334 to control processor 218 of mobile station 114. Control processor 218 then determines the power class of target base station 110 from the channel assignment data included in the handoff direction message.

Control processor 218 may determine the power class by comparing the PN offset of the traffic channel assigned in the handoff direction message with data stored in a memory of control processor 218. The data may indicate the range of offsets for a particular power class, or may indicate directly which PN offsets for the system are contained in each power class. Next, at step 610, control processor 218 determines whether the power class of target base station 110 is different from the power class of current base station 108. If the power class of target base station 110 is different from the power class of current base station 108, the handoff is an inter-tier handoff and the process moves to step 616. In this particular example the handoff is an inter-tier handoff so the process would move to step 616. At step 616, control processor 218 generates control commands to transmit power controller 208 that set the output transmission power for mobile station 114 on the newly assigned traffic channel Control processor 218 may adjust the output transmission power by adjusting the constant −73 up or down, depending on the differences between the power classes, in the mobile station power control equation. For example, in the example shown in FIG. 1, target base station 110 is of class 10 dB (200 mw/20 mw) below the class of base station 108, so that for a soft handoff the constant may be reduced by 10 dB.

$$\text{mean output power (dBm)} = \quad (5)$$
$$-\text{mean input power (dBm)} - 63 + \text{NOM\_PWR (dBm)} +$$
$$\text{INIT\_PWR (dBm)} + \text{the sum of all access probe corrections} +$$
$$\text{the sum of all closed loop power control corrections,}$$

and for a hard handoff the same adjustment may be done:

$$\text{mean output power (dBm)} = -\text{mean input power (dBm)} - \quad (6)$$
$$63 + \text{NOM\_PWR (dBm)} + \text{INIT\_PWR (dBm)}$$

The NOM_PWR value transmitted in the extended handoff direction message during hard handoff may also be adjusted taking into account the power class of a target base station. For example, the NON_PWR level of base stations of the power class of base station 110 could be set to provide a initial transmission power when added with the constant −63 that is acceptable for base stations of that class. The use of both the modified constant and NOM_PWR provides more range than is provided with only NOM_PWR.

Next, at step 614, the mobile station begins transmission on the new traffic channel and the handoff power control process ends and moves to step 618.

If, however, at step 610. it is determined that the power class of target base station 110 is not different from the power class of current base station 108, the process moves to step 612. At step 612, control processor 218 generates control commands to transmit power controller 208 that set the output transmission power for mobile station 114 on the newly assigned traffic channel.

As an alternative, base station identification fields (base station ID) maybe assigned throughout the system, so that a base station's power class may be determined from the base station's ID. Mobile stations may then be programmed to recognize the power class of a base station from a base station ID that is received, for example, over a pilot channel or in a handoff confirmation message along with channel assignment information. Upon receiving handoff confirmation from the system the mobile station may then adjust initial transmissions on the assigned traffic channel for the base station power class. This alternative has application in any type of cellular system, analog, TDMA or CDMA, in which an inter-tier handoff could occur.

While the invention has been particularly shown and described with respect to preferred embodiments thereof, it will be understood by those skilled in the art that changes in form and details may be made therein without departing from the scope and spirit of the invention.

What is claimed is:

1. In a telecommunications system having a mobile station and an infrastructure including a plurality of base stations, a method for controlling the transmission power of the mobile station during handoff of a call between a first base station and a second base station, said method comprising the steps of:

transmitting a first message from the mobile station to the infrastructure, said first message including a received power measurement made on a measurement channel of the second base station;

determining, in the infrastructure, a first parameter from said received power measurement, the transmission power of the second base station on said measurement channel, and a power level at which a signal from the mobile station is to be received at the second base station;

transmitting a second message from the infrastructure to the mobile station, said second message including said first parameter;

determining, in the mobile station, a transmit power level from said first parameter; and transmitting from the mobile station to the second base station on a traffic channel at said transmit power level.

2. The method of claim 1, wherein said step of transmitting a first message comprises transmitting a first message from the mobile station to the first base station, and said step of determining a first parameter comprises the steps of:

transmitting a third message from the first base station to the second base station, said third message including said received power measurement; and determining, at the second base station, a first parameter from said received power measurement, a first power level and a second power level, said first power level being the transmission power of the second base station on said measurement channel and said second power level being a power level at which a signal from the mobile station is to be received at the second base station.

3. The method of claim 2, wherein said step of transmitting from the infrastructure to the mobile station comprises the steps of:

transmitting a fourth message from the second base station to the first base station, said fourth message including said first parameter; and transmitting a fifth message from the first base station to the mobile station, said fifth message including said first parameter.

4. The method of claim 2, wherein said step of transmitting from the infrastructure to the mobile station comprises transmitting a fourth message from the second base station to the mobile station, said fourth message transmitted on an air interface and including said first parameter.

5. The method of claim 1, wherein said first base station and said second base station operate at substantially different power levels.

6. The method of claim 1, wherein the system comprises a system operating according to the IS-95 system standard.

7. In a telecommunications system having a mobile station and an infrastructure including a plurality of base stations, a method for controlling the transmission power of the mobile station during handoff of a call between a first base station and a second base station, said method comprising the steps of:

transmitting a first message from the mobile station to the infrastructure, said first message being a request for a handoff of a call from the first base station to the second base station;

transmitting a second message from the infrastructure to the mobile station in response to receiving said first message, said second message including a first power level and a second power level, said first power level being a transmission power level of the second base station on a handoff measurement channel, and said second power level being a power level at which a signal from said mobile station is to be received at the second base station;

determining in the mobile station, in response to receiving said second message, a third power level from said first power level, said second power level and a fourth power level, said fourth power level being a power level at which a signal was received at the mobile station from said second base station on said handoff measurement channel; and transmitting from the mobile station to the second base station on a traffic channel at said third power level.

8. The method of claim 7, wherein said step of transmitting a first message comprises transmitting a first message from the mobile station to the first base station, and said step of transmitting a second message comprises transmitting a second message from the first base station to the mobile station.

9. The method of claim 7, wherein said step of step of transmitting a first message comprises transmitting a first message from the mobile station to the first base station, and said step of transmitting a second message comprises transmitting a second message from the second base station to the mobile station.

10. The method of claim 7, wherein the first base station and the second base station operate at substantially different power levels.

11. The method of claim 7, wherein the system comprises a system operating according to the IS-95 system standard.

12. In a telecommunications system having a mobile station and a plurality of base stations, a method for controlling the transmission power of the mobile station during handoff of a call between a first base station and a second base station, said method comprising the steps of:

assigning the second base station to a base station power class;

storing an identification parameter of said second base station in association with said base station power class in the mobile station;

determining in the mobile station, in response to initiation of a handoff of a call from the first base station to the second base stations said base station power class for the second base station from said identification parameter;

determining in the mobile station, in response to determining said base station power class, a power level from said base station power class; and transmitting from the mobile station to the second base station on a traffic channel at said power level.

13. The method of claim 12, wherein said system comprises a code division multiple access (CDMA) system, said step of storing comprises storing a PN offset of a pilot channel of said second base station, and wherein said step of determining said base station power class comprises determining said base station power class from said PN offset.

14. The method of claim 12, wherein said step of storing comprises storing a base station identification of said second base station, and wherein said step of determining said base station power class comprises receiving a handoff message including said base station identification, and determining said base station power class from said identification parameter.

15. The method of claim 12, wherein said step of storing comprises storing a base station identification of said second base station, and wherein said step of determining said base station power class comprises receiving a base station identification parameter on a pilot channel of said second base station, and determining said base station power class from said identification parameter.

16. In a telecommunications system having a mobile station and an infrastructure including a plurality of base stations, an apparatus for controlling the transmission power of the mobile station during handoff of a call between a first base station and a second base station, said apparatus comprising:

a first transmitter means for transmitting a first message from the mobile station to the infrastructure, said first message including a received power measurement made on a measurement channel of the second base station;

a first determiner means for determining, in the infrastructure, a first parameter from said received power measurement, the transmission power of the second base station on said measurement channel, and a power level at which a signal from the mobile station is to be received at the second base station;

a second transmitter means for transmitting a second message from the infrastructure to the mobile station, said second message including said first parameter determined by said determiner means; and a second determiner means for determining, in the mobile station, a transmit power level from said first parameter; wherein said first transmitter means transmits from the mobile station to the second base station on a traffic channel at said transmit power level.

17. In a telecommunications system having a mobile station and an infrastructure including a plurality of base stations, an apparatus for controlling the transmission power of the mobile station during handoff of a call between a first base station and a second base station, said apparatus comprising:

first transmitter means for formatting a first message and for transmitting said first message from the mobile station to the infrastructure, said first message being a request for a handoff of a call from the first base station to the second base station;

second transmitter means for formatting a second message and for transmitting said second message from the infrastructure to the mobile station in response to receiving said first message, said second message including a first power level and a second power level, said first power level being a transmission power level of the second base station on a pilot channel, and said second power level being a power level at which a signal from said mobile station is to be received at the second base station; and determiner means for determining in the mobile station, in response to receiving said second message, a third power level from said first power level, said second power level and a fourth power level, said fourth power level being a power level at which a signal was received at the mobile station from said second base station on said pilot channel; wherein said first transmitter means transmits from the mobile station to the second base station on a traffic channel at said third power level.

18. In a telecommunications system having a mobile station and an infrastructure including a plurality of base stations, an apparatus for controlling the transmission power of the mobile station during handoff of a call between a first base station and a second base station, said apparatus comprising:

assigner means for assigning the second base station to a base station power class;

storage means for storing an identification parameter of said second base station in association with said base station power class in the mobile station;

first determiner means for determining in the mobile station, in response to initiation of a handoff of a call from the first base station to the second base station, said base station power class for the second base station from said stored identification parameter;

second determiner means for determining in the mobile station, in response to determining said base station power class, a power level; and transmitter means for transmitting from the mobile station to the second base station on a traffic channel at said determined power level.

* * * * *